United States Patent
Inzerillo (10) Patent No.: US 9,473,815 B1
(45) Date of Patent: Oct. 18, 2016

(54) CONTENT REDISTRIBUTION PROTECTION

(71) Applicant: MLB Advanced Media, L.P., New York, NY (US)

(72) Inventor: Joe Inzerillo, New York, NY (US)

(73) Assignee: MLB Advanced Media, L.P., New York, NY (US)

( * ) Notice: Subject to any disclaimer, the term of this patent is extended or adjusted under 35 U.S.C. 154(b) by 0 days.

(21) Appl. No.: 13/856,741

(22) Filed: Apr. 4, 2013

Related U.S. Application Data (60) Provisional application No. 61/620,906, filed on Apr. 5, 2012.

(51) Int. Cl.
   *H04N 7/16* (2011.01)
   *H04N 21/45* (2011.01)

(52) U.S. Cl.
   CPC .................. *H04N 21/4508* (2013.01)

(58) Field of Classification Search
   CPC ..................................... H04N 7/17318
   See application file for complete search history.

(56) References Cited

U.S. PATENT DOCUMENTS

| | | | | |
|---|---|---|---|---|
| 2002/0023123 A1* | 2/2002 | Madison | ............ | G06F 17/3087 709/203 |
| 2004/0003281 A1* | 1/2004 | Sonoda et al. | ................ | 713/200 |
| 2006/0206803 A1* | 9/2006 | Smith | ............... | G06F 17/30864 715/201 |
| 2007/0276925 A1* | 11/2007 | La Joie et al. | ................ | 709/219 |
| 2010/0037251 A1* | 2/2010 | Lindhult | ......................... | 725/31 |
| 2010/0071076 A1* | 3/2010 | Gangotri | ................. | G06F 21/10 726/32 |
| 2010/0313235 A1* | 12/2010 | Straub | ........................... | 725/131 |
| 2012/0216236 A1* | 8/2012 | Robinson et al. | ............. | 725/118 |
| 2012/0278837 A1* | 11/2012 | Curtis | ................. | H04N 21/8126 725/42 |
| 2013/0246430 A1* | 9/2013 | Szucs | ................. | G06F 17/30011 707/738 |

* cited by examiner

*Primary Examiner* — Brian Yenke
*Assistant Examiner* — Samira Monshi
(74) *Attorney, Agent, or Firm* — Foley & Lardner LLP (57) ABSTRACT

Aspects of the disclosure are directed to a novel approach for content protection. Specifically, various embodiments employ data feeds to continuously or periodically inform placeshifting devices of protected content. The placeshifting devices then filter or otherwise block the protected content from being re-transmitted over a network based on this information. In some embodiments, the data feeds take the form of Really Simple Syndicating (RSS) or Atom feeds. These data feeds may carry information about the protected content, such as the time, the title, and the channel of specific audio/video protected content. Based on this information, the placeshifting device can determine which content is protected and not eligible for re-transmission.

31 Claims, 4 Drawing Sheets

CONTENT REDISTRIBUTION PROTECTION

CROSS-REFERENCE TO RELATED APPLICATIONS

This application claims the benefit under 35 U.S.C. §119 (e) of U.S. Provisional Application No. 61/620,906, filed on Apr. 5, 2012, the contents of which are hereby incorporated by reference in their entirety into the present disclosure.

FIELD

Various embodiments relate generally to content redistribution protection. More particularly, various embodiments relate to providing notice to placeshifting devices that specific content is protected and/or preventing the placeshifting devices from retransmitting the protected content over a communication network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims provided herein and is not admitted to be prior art by inclusion in this section.

Placeshifting technology has recently become a popular means to deliver audio/video content from one device to another device. In particular, placeshifting technology is generally used to retrieve audio/video content from a first device, such as a television, computer, or cable box, and transmit the audio/video content to another device over a communication network, such as the Internet. This essentially allows for access to the audio/video content intended for the first device from anywhere in the world via the second device. For example, a placeshifting device may be connected to a user's cable box and be used to stream signals over the Internet to a user's computer, laptop, or hand held device in a different geographic location.

While many users appreciate the ability to access audio/video content from anywhere in the world via a network connection, placeshifting technology presents a significant problem with respect to copyrights and other digital or distribution rights. In particular, content providers are concerned that placeshifting devices allow audio/video content to be distributed to unintended recipients and/or unintended destinations. For example, a placeshifting device can be used to send pay-per-view content across the Internet to a user who has not paid for the content. Moreover, a placeshifting device can be used to send audio/video content to a geographic location that would otherwise be restricted due to, e.g., purchase program rights for a specific region or blackout restrictions for a specific region.

In the context of sports broadcasting, placeshifting technology presents a problem for sports leagues such as Major League Baseball (MLB) because MLB and/or its affiliate Major League Baseball Advanced Media (MLBAM) broadcasts various baseball games on a subscription-only basis. Moreover, MLB and/or MLBAM restricts access to games if the receiving device is in a certain geographic region or is within a certain distance of a stadium. Because placeshifting technology allows users to circumvent these restrictions, it would be advantageous to provide an efficient process by which a content provider could prevent placeshifting devices from re-transmitting protected content, or otherwise place placeshifting devices on notice that specific content is protected.

SUMMARY OF VARIOUS EMBODIMENTS

Various embodiments described herein address at least the above-mentioned need by providing a novel approach to content protection. Specifically, various embodiments employ data feeds to continuously or periodically inform placeshifting devices of protected content. The placeshifting devices then filter or otherwise block the protected content from being re-transmitted over a network based on this information.

In some embodiments, the data feeds may be Really Simple Syndicating (RSS) feeds or Atom feeds. RSS and Atom feeds, as discussed in greater detail below, are messages sent over the Internet and updated periodically. These messages may carry information about protected content, such as the time, title, and channel of the protected content. Based on this information, the placeshifting device may determine which content is protected and not eligible for re-transmission.

For example, a content provider such as MLBAM may cause one or more RSS or Atom feeds to be periodically transmitted to a plurality of placeshifting devices over the Internet. Within the RSS or Atom feeds, MLBAM may include the time, title, and channel of a particular protected game—e.g., Yankees vs. Red Sox; 7:00 PM EST; channel 110. The placeshifting devices, upon reception of these feeds, can execute the necessary internal processes to prevent re-transmission of this protected content over an associated network. As a result, the protected content is not redistributed to unintended users and/or unintended destinations, and copyrights and other digital rights are not infringed upon.

These and other advantages and features of various embodiments, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Various embodiments are described by referring to the attached drawings, in which.

DETAILED DESCRIPTION OF VARIOUS EMBODIMENTS

Figure 1:
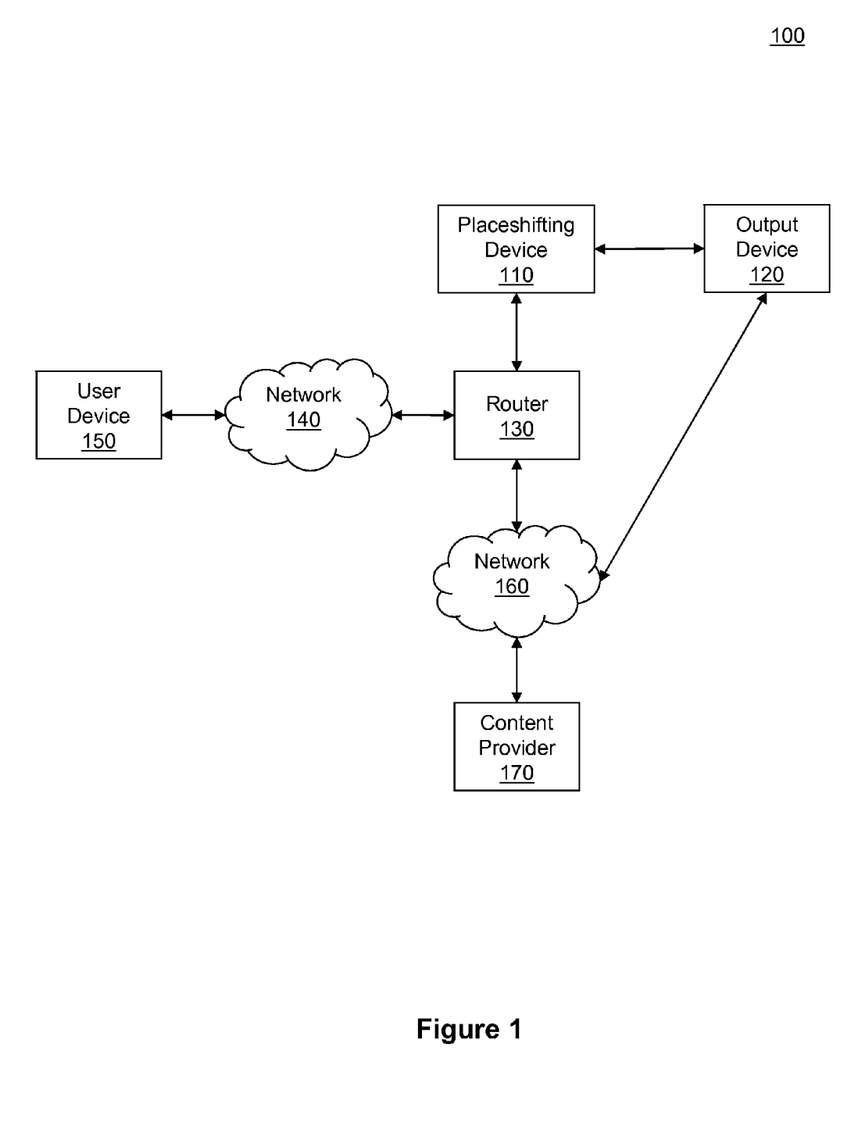
FIG. 1 is a high-level overview of a system in which various embodiments are implemented.

FIG. 1 is a high-level overview of a system 100 in which various embodiments are implemented. As illustrated, the system 100 may include a placeshifting device 110, an output device 120, a router 130, a first network 140, a user device 150, a second network 160, and a content provider 170. In some embodiments, the first network 140 and second network 160 may be the same.

The placeshifting device 110 may be electronically coupled to an audio/video output device 120 such as a regular television, a satellite television, a cable television, a DVD player, a digital video recorder (DVR) box, a camcorder, an IPod or Apple TV (docked to an Apple universal doc or an Apple iPod Hi-Fi), a computer, a cable box, a satellite box, a VCR, or the like. The placeshifting device 110 may receive audio/visual content from these audio/visual output devices 120 and transmit the content to the user devices 150 via network 140. In particular, the placeshifting device 110 may provide, e.g., National Television System Committee (NTSE) data or Phase Alternating Line (PAL) data to the user device 150 via network 140. A media player resident on the user device 150 may render the content.

In some embodiments, the placeshifting device 110 and audio/video output device 120 may be combined into a single product. For example, the placeshifting technology may be integrated with an audio/video output device such as a cable box, television, internet-enabled DVD player, and/or DVR, and thereby eliminate the need for a separate placeshifting device product. In other embodiments, the placeshifting device 110 and audio/video output device 120 may be separate products. For example, the placeshifting device 110 may be Sling Media's Singbox, Sony's LocationFree, Monsoon's HAVA, or a device running placeshifting applications such as Orb, MythTV, Cyberlink Live, Didiom, Skifta, Sharpcast, CMWare, Oxy Stems, PCTV Systems SARL, SageTV, VideoLan, and the like.

The placeshifting device 110 may be used to remotely control the audio/video output devices 120. For example, a media player resident on the user device 150 may comprise various remote-control codes which form a virtual remote for the audio-video output device 120. Through this virtual remote, a user can remotely change channels, fast forward, rewind, adjust settings such as brightness and contrast, and even access recorded programs resident on, e.g., a DVR box.

In various embodiments, the placeshifting device 110 may receive data feeds directly or indirectly from content providers 170 via network 160 and/or router 130. The content providers 170 may include cable companies (e.g., Comcast, Time Warner, Cox, etc.), television/cable networks (e.g., HBO, CBS, NBC, PBS, ESPN, TNT, TBS, etc.), movie studios (e.g., MGM, Disney, Universal, etc.), sports leagues (e.g., MLB, NFL, NHL, NBA, WNBA, FIFA, NCAA, etc.), media centers, pay-per-view providers, and the like.

These content providers 170 may cause data feeds, such as RSS feeds or Atom feeds, to be periodically or continuously sent to the placeshifting devices 110 via network 160. Network 160 may include any combination of wired or wireless networks. For example, network 160 may include any combination of the following types of networks: the Internet, an Intranet, an Ethernet LAN, a token ring LAN, a wide area network, a DSL network, a fiber optic network, a mobile telephone network (e.g., GSM, W-CDMA, CDMA, TDMA, FDMA, LTE, etc.), a UMB network, a HRPD network, a PSTN network, a WiMax network, a wireless LAN, a Bluetooth network, a satellite communications network, and the like.

Through the above mentioned-networks 160, the content providers 170 directly or indirectly transmit data feeds or cause data feeds to be transmitted to router 130. The router 130 receives these data feeds and forwards each to an associated placeshifting device 110. The placeshifting device 110 then processes the data feeds to determine what content is protected. Based on this information, the placeshifting device 110 filters, blocks, or otherwise prevents transmission of protected content over network 140 to user device 150.

It should be understood that network 140 includes the all of the types of networks mentioned above with respect to network 160, including all LANs, WANs, the Internet, and mobile telephone networks. Further, it should be understood that user device 150 includes all types of mobile and stationary devices capable of receiving and presenting audio/video content. These include desktops, laptops, netbooks, tablets, mobile phones, smartphones, PDAs, web televisions, and the like. These user devices 150 may be located at the same location as the placeshifting device 110 or at any remote location around the world.

Figure 2:
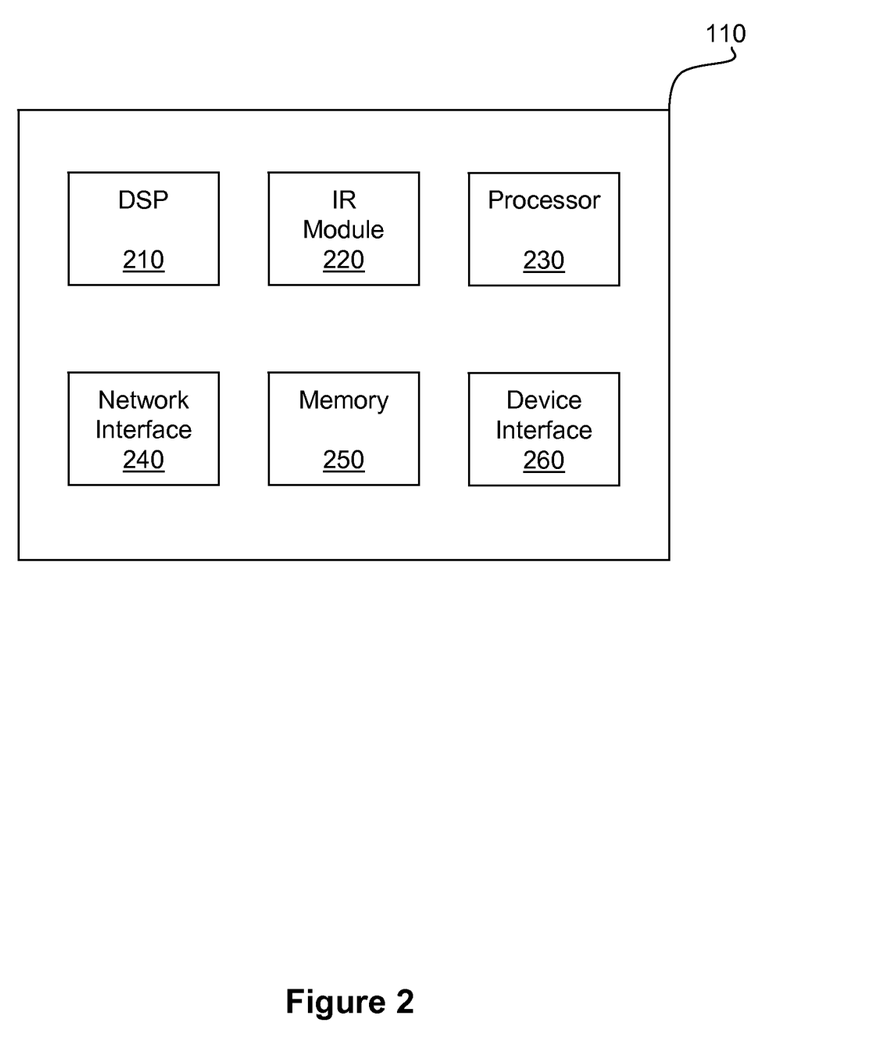
FIG. 2 is a block diagram on an exemplary placeshifting device.

FIG. 2 is a block diagram of an exemplary placeshifting device 110. The placeshifting device may include a digital signal processor (DSP) 210, an infrared interface 220, a processor 230, a network interface 240, a memory 250, and a device interface 260.

The device interface 260 is configured to interconnect the placeshifting device 110 with one or more audio/video output devices 120 and to receive audio/video signals from the one or more audio/video output devices 120. For example, these audio/video signals may be received via a S-video, coaxial, HDMI, or composite video output of a cable box. The DSP 210 may receive these audio/video signals and convert the signals into digital data that the placeshifting device 110 can manipulate. The DSP 210 may compress this data using, e.g., a Windows or Macintosh compatible codec. Once the signals are compressed and digitized, the placeshifting device 110 may broadcast or transmit a data stream in real-time via network interface 240. Network interface 240 may take the form of, e.g., an Ethernet port, and may use a streaming protocol to adjust the stream on the fly to adapt to varying network speeds. A user may then access the data stream via a local network or broadband connection and view the data stream using a media player resident on the user device 150. This, of course, assumes that the data is not protected content identified via a data feed received via network interface 240. Such protected content, as described in greater detail below, is filtered, blocked, or otherwise prevented from being transmitted from the placeshifting device 110.

If the user desires to modify a setting (e.g., change a channel) on the audio/video output device 120, the user can send a command signal from the user device 150 through network 140 and router 130 to the placeshifting device 110. The placeshifting device 110 can, upon receiving this command signal, output a command via the infrared module 220 to the associated audio/video output device 120. For example, if the audio/video output device 120 is a cable box, an infrared emitter (not shown) may be positioned in front of the cable box. When the placeshifting device 110 receives the command signal, software stored on the memory 250 of the placeshifting device 110 may cause the infrared interface 220 to emit infrared signals from the infrared emitter to an infrared emitter on the placeshifting device 110. The placeshifting device 110 may include thousands of infrared codes for different types of audio/video output devices 120, and therefore enable users to control thousands of types of audio/video output devices 120 from remote locations.

As described above, network interface 240 may take the form of an Ethernet port on the placeshifting device 110. This Ethernet port may be used to connect directly to a router via an Ethernet cable. Alternatively, a powerline-to-ethernet adapter (not shown) may be implemented and thereby turn a regular power outlet into an Ethernet jack by using a home's powerlines to send data from Ethernet enabled device (e.g., the placeshifting device 110) to another (e.g., the router 130). In another alternative, the placeshifting device 110 may be 802.11 or WiFi enabled and thereby transmit data wirelessly to router 130. The router 130 may be a Universal Plug and Play (UPnP) router. Further, the router 130 may be further connected to a cable or DSL modem (not shown).

Placeshifting device 110 includes a processor 230 electronically coupled to memory 250. The memory 250 stores software that when executed by the processor causes the placeshifting device 110 to conduct various processes. In some embodiments, the placeshifting device 110 may conduct processes based on software alone, a combination of software and hardware, or hardware alone (e.g., by a circuit). In various embodiments, the placeshifting device 110 receives inbound data feeds via network interface 240. These data feeds may take the form of, e.g., RSS or Atom feeds. The processor 230 of the placeshifting device 110 may execute software instructions stored on memory 250 to cause the placeshifting device to detect the RSS or Atom feeds and, based on the content, initiate a processes to filter, block, or otherwise prevent transmission of protected content from the placeshifting device 110.

Figure 3:
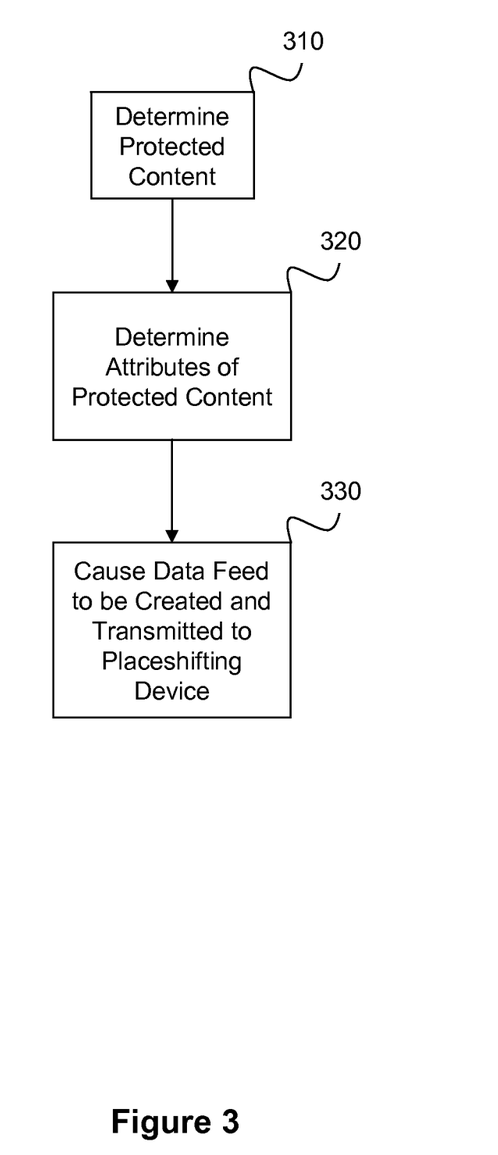
FIG. 3 is a flow chart describing various embodiments associated with one or more content providers.

FIG. 3 is a flow chart describing various embodiments associated with one or more content providers. At step 310, a content provider 170 determines what content is protected and therefore should not be retransmitted by placeshifting devices. This determination can be conducted in a number of ways. For example, the determination may be made automatically by a computing device or manually by a content provider employee. In either case, a daily, weekly, monthly, or yearly programming schedule or the like may be reviewed to determine when protected content associated with the content provider 170 is scheduled to be broadcast. For example, in the context of sports broadcasting, a programming schedule for a particular day may reveal that twenty baseball games are being broadcast and should be protected from redistribution. These baseball games may require protection because the content is, e.g., directed to paid subscribers only, subject to a blackout restriction, or limited to a specific geographic region due to the spatial nature of television licensing.

Based on the schedule information, at step 320, the content provider 170 may determine particular attributes for the protected content. For example, the content provider 170 may determine the presentation channel, the presentation time, the associated broadcast network, the estimated or actual duration of the game, the broadcast area, and/or the digital rights holders of a particular game.

As step 330, the content provider 170 may cause a data feed to be created and transmitted over network 160 to one or more placeshifting devices 110. In particular, the content provider may use or cause specialized software such as a content management system and/or one or more web servers to publish the data feed. Alternatively, the content provider may provide the particular protected content information to another entity, and that entity may cause a data feed to be transmitted via a content management system, web server, or the like. In some embodiments, a plurality of content providers 170 may provide protected content information to a central entity, and that central entity may cause data feeds to be sent to the placeshifting devices 110 via a content management system, web server, or the like. In other words, the central entity may aggregate the information received from a plurality of content providers 170 and sends one or more data feeds describing protected content associated with a plurality of content providers 170 to a plurality of placeshifting devices 110.

Each placeshifting device 110 may be programmed either at manufacture or at some point thereafter to subscribe to one or more data feeds from one or more content providers 170 or associated entities. In particular, the placeshifting devices 110 may be programmed with one or more uniform resource identifiers (URIs) of the one or more data feeds. Based on these URIs, data feed readers associated with the placeshifting devices 110 may check regularly for data feed updates. In some embodiments, these data feed updates may include information about current or upcoming programs that are protected and not available for retransmission.

In some embodiments, the data feeds are RSS feeds. RSS is a family of web feed formats used to publish frequently updated works in a standardized format. These works include blog entries, news headlines, audio, video, and, in various embodiments of the present disclosure, information about protected content. The RSS feeds may include text and metadata, and may originate from one or more web servers associated with network 160 and/or content provider 170. The RSS feeds may use the World Wide Web Consortium's Resource Description Framework (RDF) as a guide to inform the placeshifting devices 110 how to read the file, and may be based on extensible markup language (XML). Further, the placeshifting devices 110 may include RSS reader software, feed reader software, harvester, and/or aggregator software to read the RSS feeds.

In other embodiments, the data feeds are Atom feeds or Channel Definition Format (CDF) feeds. Atom is an alternative to RSS and uses XML language to provide web feeds. CDF is a predecessor to RSS and ATOM, and also uses XML language.

Figure 4:
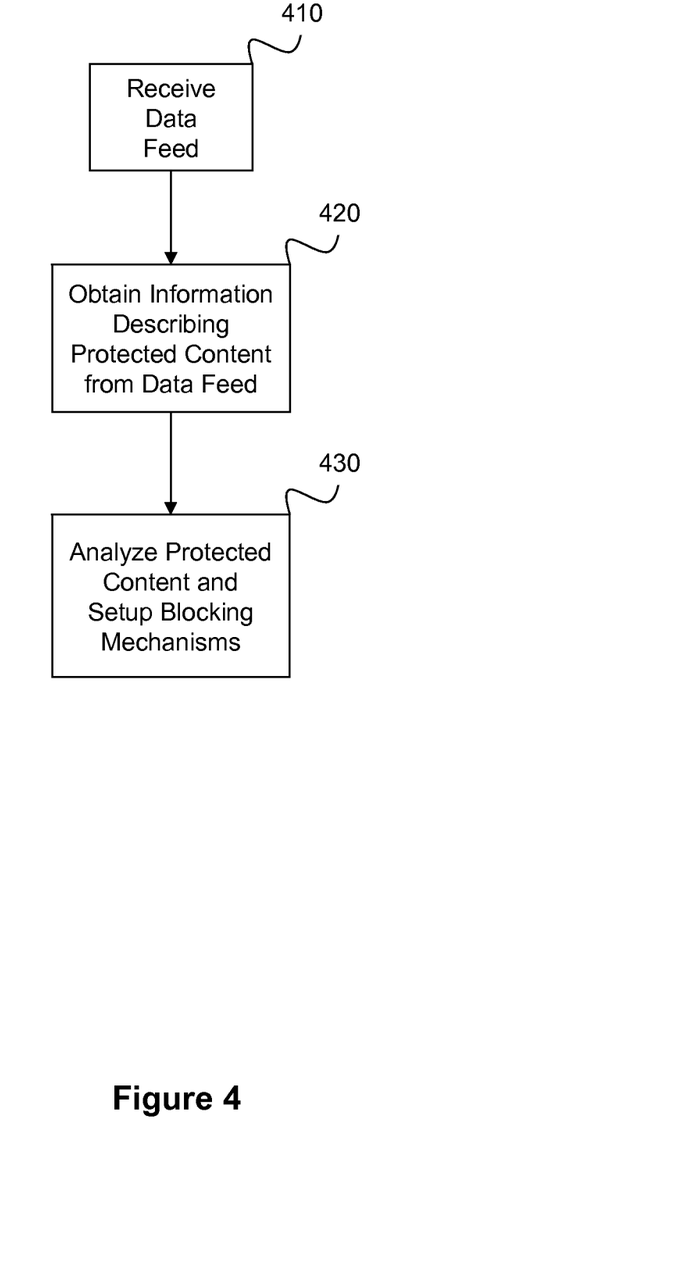
FIG. 4 is a flow chart describing various embodiments associated with one or more placeshifting devices.

FIG. 4 is a flow chart describing various embodiments associated with one or more placeshifting devices 110. At step 410, the placeshifting device 110 receives one or more data feeds. The data feed may be a RSS feed, an ATOM feed, a CDF feed, or the like. The data feed may originate from one or more content providers 170 or one or more intermediate nodes or central entities. The data feed may include information describing protected content. For example, the data feed may include particular attributes of protected content, such as the presentation channel, the presentation time, the associated broadcast network, the estimated or actual duration of the game, the broadcast area, and/or the digital rights holders a particular game.

At step 420, the placeshifting device 110 processes the one or more received data feeds to obtain the information describing the protected content. This processing may include parsing the data feed to retrieve information describing the protected content. In some embodiments, RSS reader software, feed reader software, harvester, and/or aggregator software is used to read the data feed and retrieve the information describing the protected content. Once the information describing the protected content is extracted, the information may be temporarily or permanently stored in memory 250 of the placeshifting device 110.

At step 430, the placeshifting device 110 analyzes the information describing the protected content and sets up flags, filters, alerts, or other blocking mechanisms to prevent the placeshifting device from retransmitting the protecting content. This process may include, for example, determining when the protected content is scheduled to be broadcast, what channel the protected content will be broadcast on, and how long the content will be broadcast for. The placeshifting device 110 may store this information in memory 250 and, when the protected content is scheduled to be broadcast, implement blocking procedures to prevent the content from being transmitted on network 140 to user device 150.

For example, the placeshifting device 110 may receive a data feed including the following information: Protected Content; Yankees vs. Red Sox Game; 7:00 PM EST; channel 110; 3 hour duration. The placeshifting device 110 may use a data feed reader to extract this information from the data feed. The placeshifting device 110 may then determine if this is a current or future broadcast. If this is a current broadcast that is currently being retransmitted from the placeshifting device, the placeshifting device 110 may immediately stop the transmission. If, on the other hand, this is a current broadcast that is not currently being retransmitted from the placeshifting device 110, or if this is a future broadcast, the placeshifting device 110 may store the extracted information about the protected content into memory 150. If, in the future, a user attempts to transmit this protected content via the placeshifting device 110, the placeshifting device 110 may prevent the transmission.

In various embodiments, the placeshifting device 110 may temporarily or permanently store information about future protected broadcasts in a table or database. When the placeshifting device 110 is instructed to conduct retransmission, the placeshifting device 110 may consult with this table or database to determine if the content is protected and not eligible for retransmission. If the content is not eligible for retransmission, the placeshifting device 110 may prevent the transmission.

In various embodiments, the placeshifting device 110 may provide a message to the user device 150 indicating that the content requested is protected and not eligible for retransmission. In other embodiments, the placeshifting device 110 may send an alert to a third party. For example, the placeshifting device 110 may send an alert to a content provider 170, the manufacturer of the placeshifting device 110, or another entity.

In other embodiments, the placeshifting device 110 may prevent retransmission of a entire genre of content. For example, the placeshifting device 110 may prevent retransmission of all sporting events. Or, the placeshifting device 110 may prevent retransmission of all MLB games. This type of prevention may be in response to receipt of numerous data feeds of the same type. For example, the placeshifting device 110 may have received a threshold number of data feeds indicating that MLB games are protected. The placeshifting device 110 may in response setup a permanent filter or blocking mechanism to prevent retransmission of all MLB games in the future.

While various embodiments have described RSS feeds or Atom feeds, it should be understood that other types of messaging may be used to inform the placeshifting device of protected content 110. For example, email messaging, SMS messaging, MMS messaging, instant messaging, and the like may be used. Further, while various embodiments have described protecting baseball games from retransmission, it should be understood that other types of content may also be protected. For example, movies, television shows, commercials, web content, and other sporting events (football, basketball, hockey, boxing, etc.) may also be protected.

Furthermore, it should be understood that various embodiments described herein involve a method for content protection. The method involves a content provider causing one or more media programs that are not intended to be retransmitted over one or more communication networks to be determined. The content provider may then cause one or more characteristics of the one or more media programs to be determined. Based on this information, the content provider may cause one or more data feeds to be transmitted over the one or more communication networks. These one or more data feeds may comprise the one or more characteristics of the one or more media programs that are not intended to be retransmitted.

Other embodiment are directed to a non-transitory computer-readable medium having instructions stored thereon. The instructions may comprise instructions for determining one or more media programs that are not intended to be retransmitted over one or more communication networks. The instructions may further comprise instructions for determining one or more characteristics of the one or more media programs, and causing one or more data feeds to be transmitted over the one or more communication networks. These one or more data feeds may comprise the one or more characteristics of the one or more media programs.

Further embodiments are directed to additional methods. The methods involve receiving, at a computing device, one or more data feeds, wherein the one or more data feeds each comprise one or more characteristics of one or more media programs that are not intended to be retransmitted over one or more communication networks. From the one or more data feeds, the one or more characteristics of the one or more media programs are obtained. The computing device then analyzes the one or more characteristics of the one or more media programs, and prevents transmission of one or more media programs based on the analyzing.

Other embodiments are directed to a device. The device comprises a communications interface, a processor, and a memory. The communications interface may be configured to receive one or more data feeds, wherein the one or more data feeds each comprise one or more characteristics of one or more media programs that are not intended to be retransmitted over one or more communication networks. The memory may be configured to store instructions that, in response to being executed by the processor, cause the device to obtain, from the one or more data feeds, the one or more characteristics of the one or more media programs, analyze the one or more characteristics of the one or more media programs, and prevent transmission of one or more media programs based on the analyzing.

A further embodiment is directed to another non-transitory computer-readable medium having instructions stored thereon. The instructions may comprise: instructions for receiving one or more data feeds, wherein the one or more data feeds each comprise one or more characteristics of one or more media programs that are not intended to be retransmitted over one or more communication networks; instructions for obtaining, from the one or more data feeds, the one or more characteristics of the one or more media programs; instructions for analyzing the one or more characteristics of the one or more media programs; instructions for preventing transmission of one or more media programs based on the analyzing of the one or more characteristics.

Furthermore, it should be understood that one or more of the above-discussed embodiments may be implemented by executing instructions stored on a non-transitory computer-readable medium. In addition, one or more of the above-discussed embodiments various embodiments may be implemented on a device including a processor, a communication interface, and a non-transitory computer-readable medium have instructions stored thereon that, in response to being executed by the processor, cause the device to perform the above-mentioned operations.

Various embodiments described herein are described in the general context of method steps or processes, which may be implemented in some embodiments by a computer program product, embodied in a non-transitory computer-readable medium, including computer-executable instructions, such as program code, executed by computers in networked environments. The non-transitory computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Additionally, the various embodiments may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the word "module," as used herein, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The invention claimed is:

1. A method, comprising:
 a content provider causing one or more media programs that are not intended to be retransmitted over one or more communication networks to be determined;
 the content provider causing one or more characteristics of the one or more media programs that are not intended to be retransmitted over the one or more communication networks to be determined, the one or more characteristics comprising at least one of: one or more presentation times of the one or more media programs, one or more presentation channels of the one or more media programs, one or more estimated or actual durations of the one or more media programs, and one or more broadcast areas of the one or more media programs; and
 the content provider causing one or more data feeds to be transmitted over the one or more communication networks to a placeshifting device,
 wherein the one or more data feeds comprise the one or more characteristics of the one or more media programs that are not intended to be retransmitted over the one or more communication networks,
 wherein the one or more media programs are received at the placeshifting device separately from the one or more data feeds comprising the one or more characteristics of the one or more media programs,
 wherein the one or more characteristics of the one or more media programs are determined so as (i) to identify that the one or more media programs are protected such that the one or more media programs are prevented from being retransmitted over the one or more communication networks and (ii) to identify the one or more media programs to the placeshifting device such that the one or more media programs are prevented from being retransmitted over the one or more communication networks by the placeshifting device, and
 wherein all media programs belonging to a certain category are prevented from being retransmitted over the one or more communication networks in response to receiving a threshold number of data feeds indicating that the certain category is protected.

2. The method of claim 1, wherein the one or more data feeds are Really Simple Syndication (RSS) feeds, Atom feeds, or Channel Definition Format (CDF) feeds.

3. The method of claim 2, wherein the one or more data feeds are transmitted from a web server, wherein the one or more data feeds are identified by one or more uniform resource identifiers ("URIs"), and wherein the placeshifting device is programmed to subscribe to the one or more data feeds using the one or more URIs.

4. The method of claim 1, wherein the one or more media programs that are not intended to be transmitted over one or more communication networks are determined based on reviewing a programming schedule.

5. The method of claim 4, wherein the one or more media programs that are not intended to be transmitted over one or more communication networks are determined further based on determining that the one or media programs are subject to a blackout restriction.

6. The method of claim 1,
 wherein the one or more media programs are received at the placeshifting device from an audio/video output device associated with the placeshifting device, and
 wherein the one or more data feeds comprising the one or more characteristics of the one or more media programs are received at the placeshifting device from a device other than the audio/video output device.

7. The method of claim 1,
 wherein the one or more media programs and the one or more data feeds comprising the one or more characteristics of the one or more media programs are received at the placeshifting device from different sources.

8. A non-transitory computer-readable medium having instructions stored thereon, the instructions when executed by at least one processor, causing the at least one processor to perform operations comprising:
determining one or more media programs that are not intended to be retransmitted over one or more communication networks;
determining one or more characteristics of the one or more media programs that are not intended to be retransmitted over the one or more communication networks, the one or more characteristics comprising at least one of: one or more presentation times of the one or more media programs, one or more presentation channels of the one or more media programs, one or more estimated or actual durations of the one or more media programs, and one or more broadcast areas of the one or more media programs; and
causing one or more data feeds to be transmitted over the one or more communication networks to a placeshifting device,
wherein the one or more data feeds comprise the one or more characteristics of the one or more media programs that are not intended to be retransmitted over the one or more communication networks,
wherein the one or more media programs are received at the placeshifting device separately from the one or more data feeds comprising the one or more characteristics of the one or more media programs,
wherein the one or more characteristics of the one or more media programs are determined so as (i) to identify that the one or more media programs are protected such that the one or more media programs are prevented from being retransmitted over the one or more communication networks and (ii) to identify the one or more media programs to the placeshifting device such that the one or more media programs are prevented from being retransmitted over the one or more communication networks using the placeshifting device, and
wherein all media programs belonging to a certain category are prevented from being retransmitted over the one or more communication networks in response to receiving a threshold number of data feeds indicating that the certain category is protected.

9. The non-transitory computer-readable medium of claim 8, wherein the one or more data feeds are Really Simple Syndication (RSS) feeds, Atom feeds, or Channel Definition Format (CDF) feeds.

10. The non-transitory computer-readable medium of claim 9, wherein the one or more data feeds are transmitted from a web server, wherein the one or more data feeds are identified by one or more uniform resource identifiers ("URIs"), and wherein the placeshifting device is programmed to subscribe to the one or more data feeds using the one or more URIs.

11. The non-transitory computer-readable medium of claim 8, wherein the one or more characteristics are transmitted over the one or more communication networks in advance of a future broadcast of the one or media programs from a content provider to an audio/video output device associated with the placeshifting device.

12. The non-transitory computer-readable medium of claim 8, wherein the one or more media programs that are not intended to be transmitted over one or more communication networks are determined based on reviewing a programming schedule.

13. The non-transitory computer-readable medium of claim 12, wherein the one or more media programs that are not intended to be transmitted over one or more communication networks are determined further based on determining that the one or media programs are subject to a blackout restriction.

14. The non-transitory computer-readable medium of claim 8,
wherein the one or more media programs are received at the placeshifting device from an audio/video output device associated with the placeshifting device, and
wherein the one or more data feeds comprising the one or more characteristics of the one or more media programs are received at the placeshifting device from a device other than the audio/video output device.

15. A method comprising:
receiving, at a computing device, one or more data feeds, wherein the one or more data feeds each comprise one or more characteristics of one or more media programs that are not intended to be retransmitted over one or more communication networks, the one or more characteristics comprising at least one of: one or more presentation times of the one or more media programs, one or more presentation channels of the one or more media programs, one or more estimated or actual durations of the one or more media programs, and one or more broadcast areas of the one or more media programs;
obtaining, at the computing device and from the one or more data feeds, the one or more characteristics of the one or more media programs that are not intended to be retransmitted over one or more communication networks;
analyzing, at the computing device, the one or more characteristics of the one or more media programs that are not intended to be retransmitted over one or more communication networks; and
preventing, at the computing device, transmission of one or more media programs based on the analyzing of the one or more characteristics of the one or more media programs that are not intended to be retransmitted over one or more communication networks,
wherein the one or more media programs are received at the computing device separately from the one or more data feeds comprising the one or more characteristics of the one or more media programs,
wherein the one or more characteristics (i) identify that the one or more media programs are protected such that the one or more media programs are prevented from being retransmitted over the one or more communication networks and (ii) identify the one or more media programs to the computing device such that the computing device prevents the one or more media programs from being retransmitted over the one or more communication networks, and
wherein all media programs belonging to a certain category are prevented from being retransmitted over the one or more communication networks in response to receiving a threshold number of data feeds indicating that the certain category is protected.

16. The method of claim 15,
wherein the computing device is a placeshifting device, wherein the placeshifting device receives the one or more media programs from an audio/video output device associated with the placeshifting device, and wherein the placeshifting device receives the one or more data feeds comprising the one or more characteristics of the one or more media programs from a device other than the audio/video output device.

17. The method of claim 16, wherein the one or more characteristics are transmitted over the one or more communication networks in advance of a future broadcast of the one or more media programs from a content provider to the audio/video output device.

18. The method of claim 15, wherein the one or more data feeds are Really Simple Syndication (RSS) feeds, Atom feeds, or Channel Definition Format (CDF) feeds.

19. The method of claim 18, wherein the one or more data feeds are transmitted from a web server, wherein the one or more data feeds are identified by one or more uniform resource identifiers ("URIs"), and wherein the computing device is programmed to subscribe to the one or more data feeds using the one or more URIs.

20. The method of claim 15, wherein the one or more data feeds are received directly or indirectly from a content provider.

21. The method of claim 15, wherein the one or more media programs that are not intended to be transmitted over one or more communication networks are determined based on at least one of: reviewing a programming schedule, and determining that the one or media programs are subject to a blackout restriction.

22. A device comprising:
a communications interface configured to receive one or more data feeds, wherein the one or more data feeds each comprise one or more characteristics of one or more media programs that are not intended to be retransmitted over one or more communication networks, the one or more characteristics comprising at least one of: one or more presentation times of the one or more media programs, one or more presentation channels of the one or more media programs, one or more estimated or actual durations of the one or more media programs, and one or more broadcast areas of the one or more media programs;
a processor; and
a memory;
wherein the memory is configured to store instructions that, in response to being executed by the processor, cause the device to:
obtain, from the one or more data feeds, the one or more characteristics of the one or more media programs that are not intended to be retransmitted over one or more communication networks;
analyze the one or more characteristics of the one or more media programs that are not intended to be retransmitted over one or more communication networks; and
prevent transmission of one or more media programs based on the analyzing of the one or more characteristics of the one or more media programs that are not intended to be retransmitted over one or more communication networks,
wherein the one or more media programs are received at the device separately from the one or more data feeds comprising the one or more characteristics of the one or more media programs,
wherein the one or more characteristics (i) identify that the one or more media programs are protected such that the one or more media programs are prevented from being retransmitted over the one or more communication networks and (ii) identify the one or more media programs to the device such that the device prevents the one or more media programs from being retransmitted over the one or more communication networks, and
wherein all media programs belonging to a certain category are prevented from being retransmitted over the one or more communication networks in response to receiving a threshold number of data feeds indicating that the certain category is protected.

23. The device of claim 22,
wherein the device is a placeshifting device,
wherein the placeshifting device is configured to receive the one or more media programs from an audio/video output device associated with the placeshifting device, and
wherein the placeshifting device is configured to receive the one or more data feeds comprising the one or more characteristics of the one or more media programs from a device other than the audio/video output device.

24. The device of claim 23, wherein the one or more characteristics are transmitted over the one or more communication networks in advance of a future broadcast of the one or more media programs from a content provider to the audio/video output device.

25. The device of claim 22, wherein the one or more data feeds are Really Simple Syndication (RSS) feeds, Atom feeds, or Channel Definition Format (CDF) feeds.

26. The device of claim 25, wherein the one or more data feeds are transmitted from a web server, wherein the one or more data feeds are identified by one or more uniform resource identifiers ("URIs"), and wherein the device is programmed to subscribe to the one or more data feeds using the one or more URIs.

27. The device of claim 22, wherein the communication interface receives the one or more data feeds directly or indirectly from a content provider.

28. The device of claim 22, wherein the one or more media programs that are not intended to be transmitted over one or more communication networks are determined based on at least one of: reviewing a programming schedule, and determining that the one or media programs are subject to a blackout restriction.

29. A non-transitory computer-readable medium having instructions stored thereon, the instructions when executed by at least one processor, causing the at least one processor to perform operations comprising:
receiving one or more data feeds, wherein the one or more data feeds each comprise one or more characteristics of one or more media programs that are not intended to be retransmitted over one or more communication networks, the one or more characteristics comprising at least one of: one or more presentation times of the one or more media programs, one or more presentation channels of the one or more media programs, one or more estimated or actual durations of the one or more media programs, and one or more broadcast areas of the one or more media programs;
obtaining, from the one or more data feeds, the one or more characteristics of the one or more media programs that are not intended to be retransmitted over one or more communication networks;
analyzing the one or more characteristics of the one or more media programs that are not intended to be retransmitted over one or more communication networks; and preventing transmission of one or more media programs based on the analyzing of the one or more characteristics of the one or more media programs that are not intended to be retransmitted over one or more communication networks, wherein the one or more media programs are received separately from the one or more data feeds comprising the one or more characteristics of the one or more media programs, wherein the one or more characteristics (i) identify that the one or more media programs are protected such that the one or more media programs are prevented from being retransmitted over the one or more communication networks and (ii) identify the one or more media programs to the at least one processor such that the one or more media programs are prevented from being retransmitted over the one or more communication networks using the at least one processor, and wherein all media programs belonging to a certain category are prevented from being retransmitted over the one or more communication networks in response to receiving a threshold number of data feeds indicating that the certain category is protected.

30. The method of claim 1, wherein the one or more characteristics are transmitted over the one or more communication networks in advance of a future broadcast of the one or more media programs from the content provider to an audio/video output device associated with the placeshifting device.

31. The non-transitory computer-readable medium of claim 29, wherein the one or more media programs are received at a placeshifting device comprising the at least one processor from an audio/video output device associated with the placeshifting device, and wherein the one or more data feeds comprising the one or more characteristics of the one or more media programs are received at the placeshifting device from a device other than the audio/video output device.

\* \* \* \* \*